United States Patent [19]

Mihara et al.

[11] Patent Number: 5,080,334

[45] Date of Patent: Jan. 14, 1992

[54] SLIDING TYPE BUSHING HAVING INJECTION-MOLDED SLIDING SLEEVE MADE OF FIBER REINFORCED RESIN MATERIAL

[75] Inventors: Yasuhiko Mihara, Nagoya; Kiyohiko Yoshida, Kasugai; Ryouji Kanda, Komaki, all of Japan

[73] Assignee: Tokai Rubber Industries, Ltd., Japan

[21] Appl. No.: 655,998

[22] Filed: Feb. 15, 1991

[30] Foreign Application Priority Data

Feb. 19, 1990 [JP] Japan ............... 2-15501[U]

[51] Int. Cl.⁵ ............................................. B60G 11/18
[52] U.S. Cl. ............................ 267/276; 267/153; 267/281; 267/141.1; 384/302; 384/42
[58] Field of Search ............... 267/276, 281, 282, 279, 267/153, 141.2, 141.1; 384/302, 42

[56] References Cited

U.S. PATENT DOCUMENTS

| | | | |
|---|---|---|---|
| 4,744,677 | 5/1988 | Tanaka | 267/141.1 |
| 4,809,960 | 3/1989 | Kakimoto | 267/281 |

FOREIGN PATENT DOCUMENTS

| | | | |
|---|---|---|---|
| 3734910 | 9/1988 | Fed. Rep. of Germany | 267/141.1 |
| 60-3335 | 1/1985 | Japan | 267/276 |
| 0127932 | 6/1986 | Japan | 267/276 |
| 0127934 | 6/1986 | Japan | 267/276 |

*Primary Examiner*—Sherman Basinger
*Assistant Examiner*—Christopher P. Ellis
*Attorney, Agent, or Firm*—Parkhurst, Wendel & Rossi

[57] ABSTRACT

A sliding type bushing including an inner sleeve having an axially intermediate large-diameter portion, a race disposed radially outwardly of the inner sleeve, and radially spaced from the large-diameter portion, and a sliding sleeve formed of a fiber reinforced resin material between the large-diameter portion and the race. The sliding sleeve has an outer surface fixed to the race, and an inner surface which faces an outer surface of the large-diameter portion with a predetermined clearance therebetween, such that the sliding and inner sleeves are freely slidable relative to each other about the axis of the bushing. The sliding type bushing further includes a cylindrical sliding cloth fixed to the inner surface of the sliding sleeve and formed of a fibrous material having a low coefficient of sliding friction, and a pair of axial retainers for axially retaining the sliding sleeve at axially opposite end faces thereof, and a generally cylindrical elastic body disposed radially outwardly of the race, such that the elastic body is fixed to an outer surface of the race.

13 Claims, 3 Drawing Sheets

SLIDING TYPE BUSHING HAVING INJECTION-MOLDED SLIDING SLEEVE MADE OF FIBER REINFORCED RESIN MATERIAL

BACKGROUND OF THE INVENTION

1. Field of the Invention

The present invention relates to a sliding type bushing which is suitably used as a suspension bushing of a motor vehicle, for example, and which is capable of effectively preventing transmission of vibrations while absorbing an input load applied in a torsional or circumferential direction about the axis of the bushing.

2. Discussion of the Prior Art

There is known a rubber bushing for connecting a suspension arm in a vehicle suspension system, to a support member fixed to a vehicle body or a wheel support member, in a vibration damping manner, such that the suspension arm is pivotable about the axis of the support member. The known rubber bushing includes an inner and an outer metallic sleeve which are disposed in coaxial and radially spaced-apart relation with each other, and a cylindrical elastic body interposed between the inner and outer sleeves for flexible connection therebetween. The rubber bushing is adapted to absorb input vibrations applied in a radial direction perpendicular to the axis of the bushing, based on an elastic property of the elastic body. Further, the known bushing permits the inner and outer sleeves to be rotated relative to each other about the axis of the bushing, based on torsional deformation of the elastic body about the axis.

However, the stiffness of the thus constructed bushing measured in the radial direction, and the torsional stiffness thereof measured in the circumferential direction are both determined by the elasticity and configuration of the elastic body. Therefore, it is rather difficult to determine degrees of the stiffness in the radial and circumferential directions independently of each other, depending upon the required spring characteristics of the bushing. Accordingly, it is extremely difficult for the known suspension bushing to exhibit the two different characteristics required for the recent motor vehicles, that is, provide sufficiently reduced stiffness in the circumferential direction so as to improve a driving comfort of the vehicle, while providing a sufficiently high degree of stiffness in the radial direction so as to assure excellent stability and controllability of the vehicle.

In view of the above, there has been proposed a rubber bushing as disclosed in laid-open Publication No. 60-3335 of unexamined Japanese Utility Model Application. This rubber bushing has a cylindrical race which is secured to an inner or outer circumferential surface of the elastic body, and a separately formed resin sleeve which is interposed between the race and the inner or outer sleeve such that the resin sleeve is held in slidable contact with the race and the adjacent sleeve. In this arrangement, the rubber bushing exhibits a relatively low degree of torsional stiffness with respect to the input load applied in the circumferential direction thereof.

In the thus constructed rubber bushing, however, the separately formed resin sleeve is inserted in between the race and the inner or outer sleeve, and is axially gripped at its axially opposite end faces by and between respective retainer rings which are press-fitted on or in the inner or outer sleeve adjacent to the resin sleeve. Thus, the rubber bushing requires increased numbers of components and manufacturing steps, which inevitably push up the cost of the bushing. In addition, the rubber bushing suffers from reduced sliding capability, and unfavorable rattling displacements or excessive plays or clearances of the components thereof, which result from accumulated dimensional errors or a variation in the machining or forming accuracy which may arise during production of the resin sleeve, and the race and the inner or outer sleeve which are held in sliding contact with the resin sleeve. Thus, the conventional bushing cannot provide a sufficiently high degree of sliding capability.

In the rubber bushing as described above, the inner and outer circumferential surface of the resin sleeve function as sliding surfaces for slidable contact with the race and the inner or outer sleeve. Therefore, the slidability of the bushing is deteriorated if the resin sleeve is formed of a fiber reinforced resin material which contains glass fibers or other reinforcing fibers. Thus, it is hard to employ such a fiber reinforced resin as a material for the resin sleeve, so as to assure a sufficient resistance of the sleeve to the input load.

SUMMARY OF THE INVENTION

The present invention was developed in the light of the above-described prior art situations. It is therefore an object of the invention to provide a sliding type bushing which is simple in construction and can be produced with high efficiency, and which provides sufficient and stable sliding capability for dealing with an input load applied in a torsional direction around the axis thereof, while assuring a significantly improved load-resistance property.

The above object may be attained according to the principle of the present invention, which provides a sliding type bushing for connecting two members such that one of the two members is slidable relative to the other about an axis of the bushing, comprising: (a) an inner sleeve having an axially intermediate large-diameter portion which has an outside diameter larger than that of the other portions of the inner sleeve; (b) a race disposed radially outwardly of and in coaxial relation with the inner sleeve, the race having an inner surface radially spaced from an outer surface of the large-diameter portion of the inner sleeve, so as to form a radial spacing therebetween; (c) a sliding sleeve formed of a fiber reinforced resin material between the large-diameter portion of the inner sleeve and the race, the sliding sleeve having axially opposite end portions which are positioned axially outwardly of respective axial ends of the large-diameter portion, the sliding sleeve having an outer surface which is fixed to the race, and an inner surface which faces the outer surface of the large-diameter portion with a predetermined clearance therebetween, such that the sliding and inner sleeves are freely slidable relative to each other about the axis of the bushing; (d) a cylindrical sliding cloth fixed to the inner surface of the sliding sleeve, the sliding cloth being formed of a fabric material having a low coefficient of sliding friction; (e) a pair of axial retainers provided at axially opposite end portions of the race and extending in the radial direction of the bushing, for axially retaining the sliding sleeve at axially opposite end faces thereof; and (f) a generally cylindrical elastic body disposed radially outwardly of and in coaxial relation with the race, such that the elastic body is fixed to an outer surface of the race.

In the sliding type bushing of the present invention constructed as described above, the sliding sleeve is formed by filling a substantially entire volume of the radial spacing between the large-diameter portion of the inner sleeve and the race, with a suitable resin material by injection molding, for example. Accordingly, the sliding sleeve may be disposed in position upon completion of the molding, such that a predetermined amount of clearance is provided between the inner surface of the sliding sleeve and the outer surface of the large-diameter portion, based on shrinkage of the injected resin material. Thus, the present bushing is simple in construction, and can be easily produced with high efficiency. Further, the present bushing is provided with a highly accurate sliding mechanism including the sliding sleeve and the inner sleeve, which can stably provide an excellent sliding characteristic with respect to an input load applied in a torsional direction around the axis of the bushing.

In the sliding type bushing according to the present invention, the sliding cloth having a relatively low coefficient of friction is integrally secured to the inner circumferential surface of the sliding sleeve, so that the large-diameter portion of the inner sleeve is slidably rotatably supported by the sliding sleeve through the sliding cloth. In this arrangement, the sliding cloth allows for considerably smooth sliding contact between the mutually facing surfaces of the inner and sliding sleeves. Accordingly, the sliding sleeve may be formed of a fiber reinforced resin material which contains reinforcing fibers such as glass fibers, while assuring excellent slidability of the bushing. The use of the fiber reinforced resin material for the sliding sleeve leads to improvements in the mechanical strength and the load-resistance property of the bushing.

The above-indicated large-diameter portion of the inner sleeve may have axially opposite end parts each having a curved outer surface, such that an outside diameter of the axially opposite end parts decreases toward the axial ends of the large-diameter portion, respectively.

In one form of the invention, the pair of axial retainers consist of a pair of annular flanges formed integrally with the race at axially opposite ends thereof.

In another form of the invention, the axial retainers consist of a pair of retainer rings press-fitted in the axially opposite end portions of the race, respectively.

The fiber reinforced resin material of the sliding sleeve may consist principally of a thermo-plastic or thermo-setting resin containing reinforcing fibers.

Further, the sliding sleeve may be formed by injection molding of the fiber reinforced resin material.

The present sliding type bushing may further include a cylindrical reinforcing rigid member disposed at a radially intermediate portion of the elastic body, in coaxial relationship with the elastic body. This reinforcing rigid member extends in the axial direction of the bushing over the entire axial length of the elastic body.

Moreover, the present bushing may further include a pair of sealing members each of which provides a sealing between corresponding axial end portions of the inner sleeve and the race. Each of the sealing member has a radially inner retainer which is fitted on an outer surface of the axial end portion of the inner sleeve, and a radially outer retainer which is fitted on an outer surface of the axial end portion of the race.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENT

Figure 1:
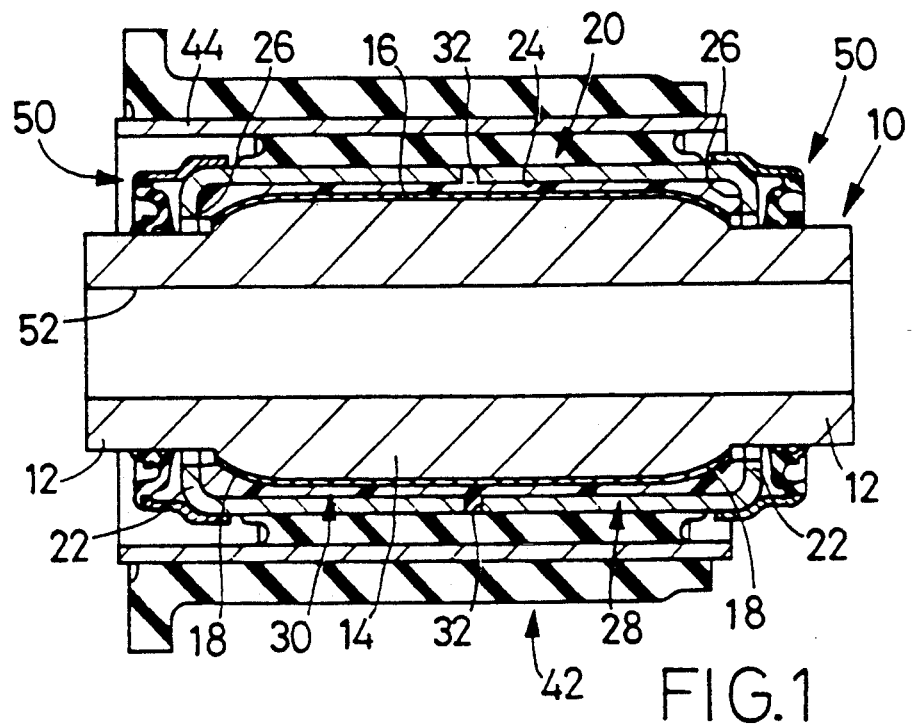
FIG. 1 is an elevational view in axial cross section of one embodiment of a sliding type bushing of the present invention.

Referring first to the elevational view of FIG. 1 showing in axial cross section one embodiment of a sliding type bushing of the invention, reference numeral 10 denotes a metallic inner sleeve which has a generally cylindrical shape. The inner sleeve 10 consists of axially opposite small-diameter end portions 12, and an axially intermediate large-diameter portion 14 interposed between the end portions 12. The large-diameter portion 14 has a comparatively large wall thickness with its outer circumferential surface having a larger diameter than that of the end portions 12, and extends over about two-thirds of the axial length of the sleeve 10. The outer circumferential surface of the large-diameter portion 14 includes an axially inner section 16 which has a constant diameter over its entire axial length, and axially outer sections 18 located on the opposite sides of the axially inner section 16, each outer section 18 having a curved profile with its diameter gradually decreasing toward the corresponding axial end of the portion 14.

Radially outwardly of the inner sleeve 10, there is provided a race 20 having a generally cylindrical shape, such that the race 20 is disposed in coaxial and radially spaced-apart relation with the inner sleeve 10. The race 20 is made of a metallic material, and has an inside diameter larger than the outside diameter of the large-diameter portion 14 of the inner sleeve 10, and an axial length larger than that of the same portion 14. Thus, the race 20 and the inner sleeve 10 are coaxially disposed such that an inner circumferential surface 24 of the race 20 is spaced by a predetermined radial distance apart from the axially inner section 16 of the outer surface of the large-diameter portion 14, in mutually radially facing relationship with each other. The race 20 has a plurality of injection holes 32 formed through the thickness of its axially intermediate portion, in the radial directions thereof.

The axially opposite end portions of the race 20 are bent radially inward to provide a pair of axial retainers in the form of a pair of annular flanges 22. These flanges 22 are located axially outwardly of the respective axial ends of the large-diameter portion 14 of the inner sleeve 10, such that an inner surface 26 of each flange 22 faces the corresponding axially outer section 18 of the outer surface of the large-diameter portion 14, with a suitable axial spacing therebetween.

Between the outer circumferential surface 16, 18 of the large-diameter portion 14 of the inner sleeve 10 and the inner circumferential surface 24 and inner surfaces 26 of the race 20, that is, between the radially and axially facing surfaces of the inner sleeve 10 and the race 20, there is interposed a sliding sleeve 28 formed of a suitable resin material. The sliding sleeve 28 has axially opposite end portions each of which protrudes axially outwards by a suitable length from the corresponding axial end of the large-diameter portion 14. The sliding sleeve 28 is formed of a fiber reinforced resin which consists principally of a thermo-plastic or thermo-setting resin, such as nylon, acetal or phenol, which is mixed with suitable reinforcing fibers, such as glass fibers, carbon fibers, or aromatic polyamide (Kevlar) fibers.

The sliding sleeve 28 is secured at its outer circumferential surface to the inner circumferential surface 24 of the race 20. The axially opposite end faces of the sliding sleeve 28 are held in contact with the inner surfaces 26 of the annular flanges 22 of the race 20, such that the sliding sleeve 28 is axially held or gripped by and between these annular flanges 22. Thus, the sliding sleeve 28 is fixedly attached or secured to the race 20. On the other hand, the inner circumferential surface of the sliding sleeve 28 is radially spaced from the outer circumferential surface 16, 18 of the large-diameter portion 14 of the inner sleeve 10, by a considerably small amount of clearance therebetween. Thus, the large-diameter portion 14 of the inner sleeve 10 is supported by the sliding sleeve 28, such that the portion 14 is freely slidably rotatable about the axis thereof with respect to the sliding sleeve 28.

The sliding sleeve 28 is provided with a cylindrical sliding cloth 30 fixed to the inner circumferential surface thereof and covering the entire area of the same surface. The sliding cloth 30 is a woven fabric of a yarn having about 100-10,000 denier and made of polytetrafluoroethylene (PTFE) or other material having a low coefficient of sliding friction. The sliding cloth 30 takes the form of a plain weave, a twill weave or a sateen weave, for example, such that the obtained cloth 30 includes 20-200 warps and wefts per inch. For assuring increased bonding strength between the sliding cloth 30 and the sliding sleeve 28, the sliding cloth 30 is preferably impregnated with a suitably selected resin, such as epoxy resin, urethane resin, phenol resin or acrylic resin. For assuring further improved bonding to the sliding sleeve 28, the sliding cloth 30 may be produced by weaving a cotton yarn into an outer peripheral portion of a cloth made of the low-frictional material as indicated above, and then impregnating the obtained cloth with a suitable resin.

Figure 2:
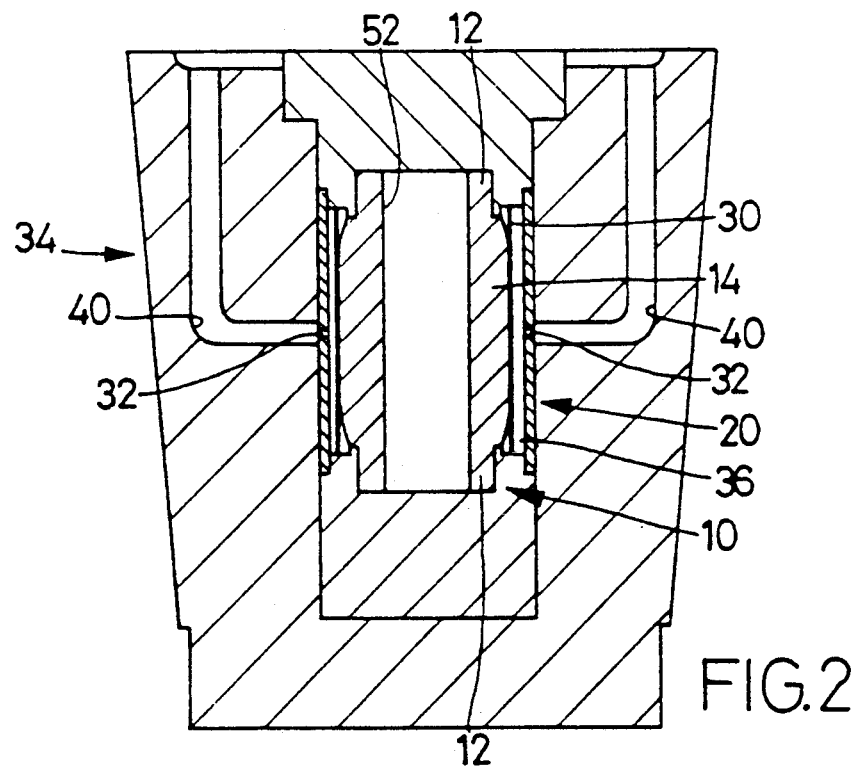
FIG. 2 is an illustration showing a step of manufacturing the sliding type bushing of FIG. 1, wherein an inner sleeve, a race and a sliding cloth are disposed in position within a ,mold cavity in a mold.
Figure 3:
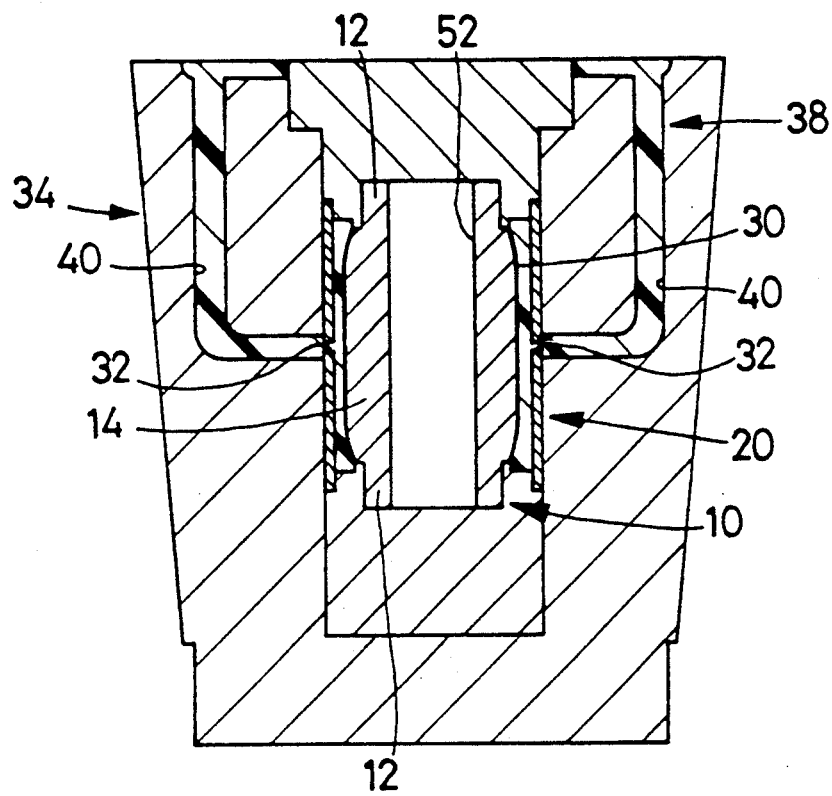
FIG. 3 is an illustration showing another step of manufacturing the sliding type bushing of FIG. 1, wherein a fiber reinforced resin material is injected into the mold to thereby form a sliding sleeve.

The sliding sleeve 28 is formed of the above-indicated fiber reinforced resin material by injection molding, as illustrated in FIGS. 2 and 3. Initially, the inner sleeve 10 is positioned within a mold cavity in a mold 34 for forming the sliding sleeve 28, and the sliding cloth 30 and the race 20 are disposed on or around the inner sleeve 10 and positioned in place within the mold cavity 30, as shown in FIG. 2. As a result, an annular space 36 is formed between the inner sleeve 10 and the race 20 within the mold cavity. The inner surface of the race 20 may be subjected to a suitable bonding treatment, as needed.

Under the above-described condition, a suitable fiber reinforced resin material 38 giving the sliding sleeve 28 is introduced through sprues 40 formed in the mold 34, and injected into the annular space 36 through the injection holes 32 formed through the race 20, so that the annular space 36 is filled with the resin material 38 to provide the sliding sleeve 28. Upon completion of the injection molding, the sliding cloth 30 is integrally fixed to the inner circumferential surface of the sliding sleeve 28.

When the resin material is cast into the sliding sleeve 28 in the mold 34, the sliding sleeve 28 is secured at its outer circumferential surface to the race 20, while filling the injection holes 32 formed through the race 20, whereby the sliding sleeve 28 is integrally fixed to the race 20 upon completion of the molding of the sleeve 28. With the outer surface of the sliding sleeve 28 being secured to the race 20, a considerably small amount of clearance is provided between the inner surface of the sliding sleeve 28 and the outer surface 16, 18 of the large-diameter portion 14 of the inner sleeve 10, based on shrinkage of the resin material after the injecting operation. Consequently, the inner surface of the sliding sleeve 28 to which the sliding cloth 30 is bonded is curved closely following the outer surface 16, 18 of the large-diameter portion 14 of the inner sleeve 10.

Subsequently, the thus formed sliding sleeve 28, the inner sleeve 10 and the race 20 are removed from the mold 34, and the axially opposite end portions of the race 0 are bent by roll forming to provide the annular flanges 2, which abut on the opposite axial end faces of the sliding sleeve 28. Thus, the sliding sleeve 28 is retained in place in the axial direction by means of the flanges 22 of the race 20.

On the outer circumferential surface of the race 20 which supports the sliding sleeve 28 as described above, there is provided a relatively thick-walled, generally cylindrical elastic body 42 made of a rubber material, as shown in FIG. 1, such that the elastic body 42 is secured to the outer surface of the race 20 by means of vulcanization. The elastic body 42 is provided at its radially intermediate portion with a cylindrical reinforcing metallic member 44. This reinforcing member 44 is bonded to the elastic body 42 by means of vulcanization, such that the reinforcing member 44 is disposed in coaxial relation with the elastic body 42, and extends through the body 42 in the axial direction. In the presence of the reinforcing member 44, the elastic body 42 exhibits a comparatively hard spring characteristic with respect to an input load applied in a radial direction perpendicular to the axis of the present bushing.

Figure 4:
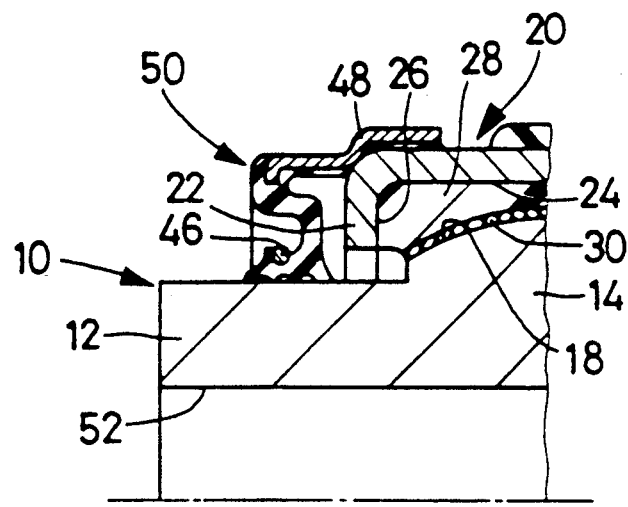
FIG. 4 is a fragmentary view in axial cross section of the sliding type bushing of FIG. 1, which shows in enlargement one of a pair of sealing members of the sliding type bushing of FIG. 1.

The inner sleeve 10 and the race 20 are assembled, such that the inner sleeve 10 is slidable relative to the race 20, via the slidable sleeve 28 interposed therebetween. Between the corresponding axial end portions of the inner sleeve 10 and the race 20, there are provided annular sealing rubber members 50 each of which has a retainer ring 46 and a retainer member 48 at its radially inner and outer ends, respectively, as shown in FIG. 4. The radially inner end portion of the sealing rubber member 50 is fitted on the outer surface of the corresponding small-diameter portion 12 of the inner sleeve 10 by means of the retainer ring 46, while the radially outer end portion of the sealing rubber member 50 is fitted on the outer surface of the corresponding axial end portion of the race 20 by means of the retainer member 48. Thus, the sealing rubber member 50 provides a sealing between the corresponding axial end portions of the inner sleeve 10 and the race 20, to thereby seal the sliding sleeve 28 and the sliding cloth 30, and the outer surface 16, 18 of the inner sleeve 10 from the external space of the bushing.

The instant bushing constructed as described above is used to flexibly connect two members (not shown), one of which is a pivot shaft, and the other of which is a suspension arm or rod, for example, having a mounting hole at its end. The bushing is installed such that the pivot shaft is inserted through an inner bore 52 of the inner sleeve 10 while the elastic body 42 is fitted in the mounting hole of the arm. Thus, the pivot shaft and the suspension arm are flexibly connected by the bushing interposed therebetween, such that the arm is pivotable about the pivot shaft, and such that the arm can be oscillated with respect to the axis of the pivot shaft in the radial direction thereof.

In the thus constructed sliding type bushing, the large-diameter portion 14 of the inner sleeve 10 is retained or supported by the sliding sleeve 28, such that the outer surface of the large-diameter portion 14 is held in contact with the the sliding cloth 30 integrally bonded to the inner surface of the sliding sleeve 28. Accordingly, the sliding sleeve 28 may be formed of a fiber reinforced resin having a relatively low degree of slidability, since the sliding cloth 30 fixed to the sleeve 28 assures sufficient slidability of the sliding sleeve 28 with respect to the large-diameter portion 14, about the axis of the bushing. The sliding sleeve 28 formed of the fiber reinforced resin provides a sufficient resistance to the input load.

Further, in the instant sliding type bushing, the sliding sleeve 28 is formed by filling an appropriate space in the bushing (i.e., annular space 36 in the mold 34) with a suitable resin material, such that the sleeve 28 is bonded to the race 20 during the formation of the sleeve 28. Accordingly, the instant sliding type bushing is greatly simplified in its construction, and is produced with a significantly improved efficiency, as compared with a conventional counterpart.

Since the sliding sleeve 28 is formed by directly injecting the resin material into the annular space 38 defined by the race 20 and the large-diameter portion 14 of the inner sleeve 10, any dimensional error or variation in the dimensional accuracy of the race 20 and the large-diameter portion 14 can be absorbed or accommodated by the thus formed sliding sleeve 28. Accordingly, a uniform and suitably small clearance is provided between the inner surface of the sliding sleeve 28 and the outer surface of the large-diameter portion 14, based on the shrinkage of the resin material filling the annular space 38. Thus, the instant bushing surely has a highly accurate sliding mechanism consisting of the sliding sleeve 28, the race 20 and the inner sleeve 10, which is free from radial rattling movements of the race 20 and sliding sleeve 18 relative to the inner sleeve 10.

The sliding sleeve 28 is retained at its axially opposite ends by the annular flanges 22 formed as an integral part of the race 20, whereby the instant bushing provides a sufficiently high resistance to the input load or force applied thereto in the axial direction.

Some specimens of the sliding type bushing of the instant embodiment, and a comparative example of a conventional bushing as disclosed in the above-indicated publication No. 60-3335 were tested by the inventors of the present invention, in terms of (1) a resistance to the input load applied in the radial direction of the bushing, which resistance is expressed as a permissible maximum surface pressure, (2) an amount of radial displacement of the bushing, and (3) a sliding resistance of the inner sleeve 10 and the sliding sleeve 28, which resistance is expressed as a torque required for rotating the two members relative to each other. The test (1) indicated that the conventional bushing had the permissible maximum surface pressure of 200 kg/cm$^2$ or lower, while all specimens of the instant bushing had the same pressure of 200 kg/cm$^2$ or higher. The test (2) indicated that the amount of the radial displacement of the conventional bushing was within a range of 0.2 mm to 0.3 mm, while that of all specimens of the instant bushing was as small as 0.05 mm. The test (3) indicated that the sliding torque of the conventional bushing was within a range of 3–30 kg.cm while that of the instant bushing was within a range of 3–10 kg.cm. It follows from the above results that the sliding type bushing of the instant embodiment is much more excellent than the conventional counterpart, in terms of durability, dimensional accuracy and slidability.

In the sliding type bushing of the instant embodiment, the sliding surface of the large-diameter portion 14 of the inner sleeve 10 includes the axially outer sections 18 which are respectively opposed to the axially opposite end portions of the inner surface of the sliding sleeve 28 substantially in the axial direction. That is, these axially outer sections 18 are rounded so that the outside diameter of the sections 18 gradually decreases toward their axially opposite ends, to thereby avoid a rapid change in the wall thickness of the sliding sleeve 28. Consequently, a constant annular clearance can be formed between the sliding surfaces of the inner sleeve 10 and sliding sleeve 28, based on the shrinkage of the resin material of the sliding sleeve 28, assuring significantly improved slidability of the bushing.

While the present invention has been described in its presently preferred embodiment, for illustrative purpose only, it is to be understood that the invention is not confined to the details of the illustrated embodiment, but may be otherwise embodied.

In the illustrated embodiment, the axially opposite end portions of the large-diameter portion of the inner sleeve have respective curved or rounded outer surfaces which are more or less axially opposed to the sliding sleeve, such that the outside diameter of the large-diameter portion decreases towards its axially opposite ends. However, the profile of the axially opposite end portions of the large-diameter portion is not limited to such a curved shape, but may be suitably changed. For example, each axial end portion of the outer surface of the large-diameter portion may take the form of an end face which is normal to the axis of the bushing, or may be tapered, chamfered or otherwise inclined.

While the sliding sleeve is retained by the race such that the outer surface of the sleeve is bonded to the inner surface of the race in the illustrated embodiment, the sliding sleeve may be otherwise retained by the race. For example, the inner surface of the race may be formed with protrusions or recesses adapted for engagement with the corresponding recesses or protrusions formed in or on the outer surface of the sliding sleeve.

In the illustrated embodiment, the resin material for the sliding sleeve is injected into the annular space 36, through the injection holes 32 formed through the race 32. However, the resin material may be injected through an annular opening or openings formed between the corresponding axial end portions of the race 20 and the inner sleeve 10.

Figure 5:
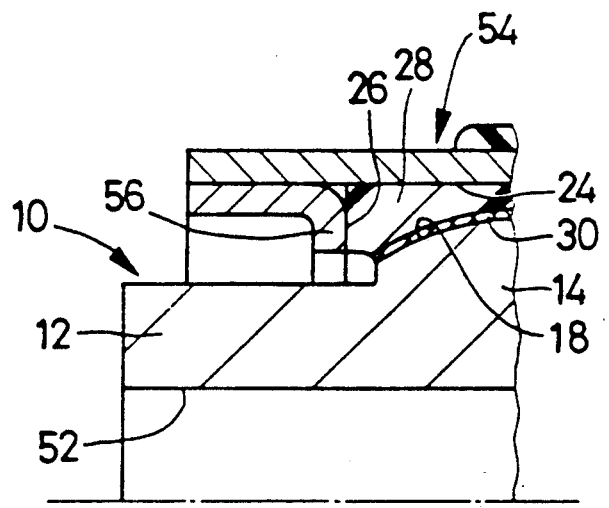
FIG. 5 is an enlarged cross sectional view of another embodiment of the invention, which shows an axial retainer provided on one axial end of the race, which is structurally different from that of the bushing of FIG. 1.

While the annular flanges 22 of the race 20 serve as the pair of axial retainers provided at the axial end portions of the race 20 in the illustrated embodiment, the axial retainers may take the form of a pair of annular retainer rings 56 which are press-fitted in respective axially opposite end portions of a cylindrical race 54, as shown in FIG. 5.

It will also be understood that various other changes, modifications and improvements may be made in the present invention, which may occur to those skilled in the art, without departing from the spirit and scope of the invention defined in the following claims.

What is claimed is:

1. A sliding type bushing for connecting two members such that one of said two members is slidable relative to the other about an axis of the bushing, comprising:
   an inner sleeve having an axially intermediate large-diameter portion which has an outside diameter larger than that of the other portions of said inner sleeve;
   a race disposed radially outwardly of and in coaxial relation with said inner sleeve, said race having an inner surface radially spaced from an outer surface of said large-diameter portion of the inner sleeve, so as to form a radial spacing therebetween;
   a sliding sleeve formed of a fiber reinforced resin material between said large-diameter portion of the inner sleeve and said race, said sliding sleeve having axially opposite end portions which are positioned axially outwardly of respective axial ends of said large-diameter portion, said sliding sleeve having an outer surface which is fixed to said race, and an inner surface which faces said outer surface of said large-diameter portion with a predetermined clearance therebetween, such that said sliding and inner sleeves are freely slidable relative to each other about the axis of the bushing;
   a cylindrical sliding cloth fixed to said inner surface of said sliding sleeve, said sliding cloth being formed of a fibrous material having a low coefficient of sliding friction;
   a pair of axial retainers provided at axially opposite end portions of said race and extending in the radial direction of the bushing, for axially retaining said sliding sleeve at axially opposite end faces thereof; and
   a generally cylindrical elastic body disposed radially outwardly of and in coaxial relation with said race, such that said elastic body is fixed to an outer surface of said race.

2. A sliding type bushing according to claim 1, wherein said large-diameter portion of the inner sleeve has axially opposite end parts each having a curved outer surface, such that an outside diameter of said axially opposite end parts decreases toward said axial ends of said large-diameter portion, respectively.

3. A sliding type bushing according to claim 1, wherein said pair of axial retainers consist of a pair of annular flanges formed integrally with said race at axially opposite ends thereof.

4. A sliding type bushing according to claim 1, wherein said axial retainers consist of a pair of retainer rings press-fitted in said axially opposite end portions of said race, respectively.

5. A sliding type bushing according to claim 1, wherein said fiber reinforced resin material of said sliding sleeve consists principally of a thermo-plastic or thermo-setting resin containing reinforcing fibers.

6. A sliding type bushing according to claim 5, wherein said thermo-plastic or thermo-setting resin is selected from the group consisting of nylon, acetal and phenol.

7. A sliding type bushing according to claim 5, wherein said reinforcing fibers are selected from the group consisting of glass fibers, carbon fibers, and aromatic polyamide fibers.

8. A sliding type bushing according to claim 1, wherein said sliding cloth is formed of polytetrafluoroethylene.

9. A sliding type bushing according to claim 1, wherein said sliding cloth is impregnated with a resin selected from the group consisting of epoxy resin, urethane resin, phenol resin and acrylic resin.

10. A sliding type bushing according to claim 1, wherein said sliding sleeve is formed by injection molding of said fiber reinforced resin material.

11. A sliding type bushing according to claim 10, wherein said race has a plurality of injection holes formed therethrough, said fiber reinforced resin material filling said injection holes.

12. A sliding type bushing according to claim 1, further comprising a cylindrical reinforcing rigid member disposed at a radially intermediate portion of said elastic body, in coaxial relationship with said elastic body, said reinforcing rigid member extending in the axial direction of the bushing over the entire axial length of said elastic body.

13. A sliding type bushing according to claim 1, further comprising a pair of sealing members each of which provides a sealing between corresponding axial end portions of said inner sleeve and said race, each of said sealing member comprising a radially inner retainer which is fitted on an outer surface of the axial end portion of said inner sleeve, and a radially outer retainer which is fitted on an outer surface of the axial end portion of said race.

* * * * *